Aug. 29, 1967　　　R. M. SHIPLEY, JR　　　3,338,040
TREE SHAKER APPARATUS
Filed Jan. 27, 1964
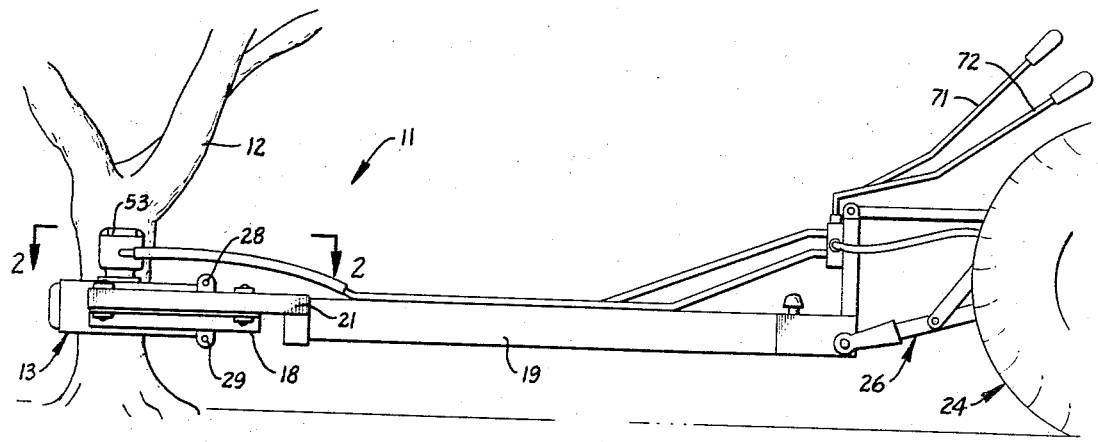
FIG. 1.
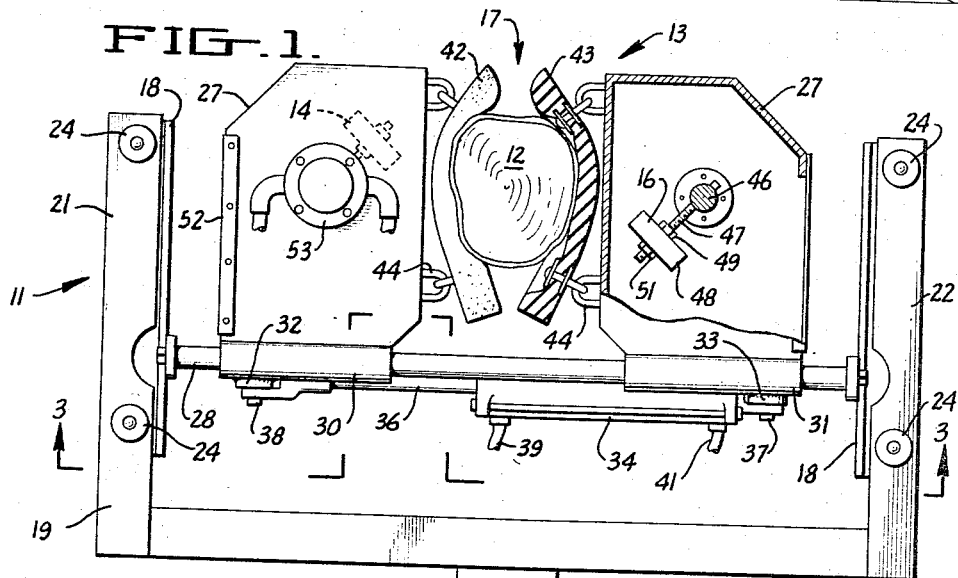
FIG. 2.
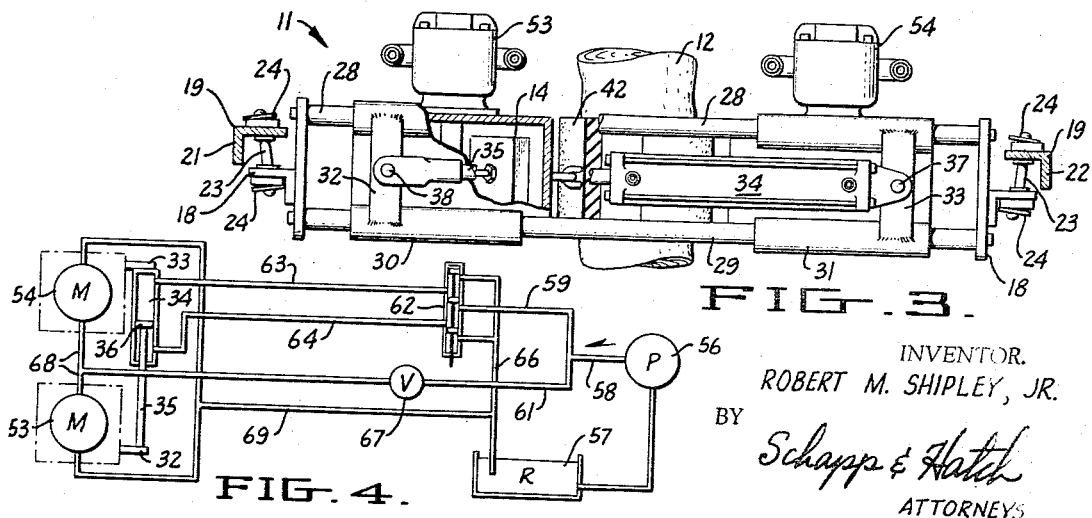
FIG. 3.
FIG. 4.
INVENTOR.
ROBERT M. SHIPLEY, JR.
BY
Schapp & Hatch
ATTORNEYS Patented Aug. 29, 1967

3,338,040
TREE SHAKER APPARATUS
Robert M. Shipley, Jr., Preston Heights,
Cloverdale, Calif. 95425
Filed Jan. 27, 1964, Ser. No. 340,462
6 Claims. (Cl. 56—328)

The present invention relates to improvements in a tree shaker apparatus, and more particularly to a tree shaker apparatus having a vibrating unit which is adapted to be clamped to the tree to be shaken and supported thereon.

It is known to gather ripened fruits or nuts by shaking the tree and gathering the harvest from the ground or a collecting means using one of the number of known methods. In one type of shaker, the trees are shaken by means of a cable or similar device which periodically pulls and releases the trunk or branch to dislodge the fruit from the tree. Another type of shaker utilizes a rigid member or boom which is oscillated so as to force the limbs of the tree back and forth with a reciprocating motion. Obviously, the second type of motion is superior to the first type of motion, because it provides positive forces in two different directions. However, the two directions selected will be more satisfactory to dislodge some of the fruits or nuts than others and optimum shaking action is only provided on a small part of the tree. Therefore, it is desirable to produce a tree shaking apparatus which provides vibratory motion in a plurality of directions in a plane perpendicular to the trunk or a limb of the tree to be shaken.

Accordingly, it is a primary object of the present invention to provide a tree shaker apparatus which is capable of providing force vectors at various different angles with respect to the portion of the tree being gripped by the shaker so as to obtain optimum shaking motion. With such a system, it is possible to provide maximum shaking with the minimum of forces so that the likelihood of injuring the tree is also minimized.

The type of motion which is most satisfactory for dislodging fruits or nuts varies for different trees, and the use of irregular forces is generally preferable. Therefore, it is another object of the invention to provide a tree shaker apparatus capable of providing irregular vibratory forces.

Certain other problems have also been encountered in tree shaking apparatus in general, and the present invention is directed to provide solutions for these problems as well as to retain the advantages of prior known devices.

For example, it has always been a problem to effect sufficient gripping on the tree for the shaker units to impart energy thereto and yet provide a grip that does not injure the tree. It is also considered desirable to provide an easily controlled source of energy to the shaker and to utilize a standard farm tractor or equivalent vehicle to provide energy and mobility to the unit.

Accordingly, it is a further object of the present invention to provide a tree shaker of the character described which has improved clamping means for gripping the tree to be shaken by distributing the clamping forces more evenly over a larger surface of the tree.

A still further object of the invention is to provide means whereby the shaking element may be adjusted to different characteristics so as to change from large trees to small trees or the reverse without loss of desirable performance of the device.

Still another object of the invention is to provide a tree shaking apparatus of the character described which may be mounted on a tractor or like unit and which may be hydraulically powered so as to utilize power from a power take-off of the vehicle in combination with conventional hydraulic equipment.

Further objects and advantages of the invention will be apparent as the specification progresses, and the new and useful features of the tree shaker apparatus will be fully defined in the claims attached hereto.

The preferred form of my invention is illustrated in the accompanying drawing forming part of this description in which:

FIGURE 1 is an elevational view illustrating a typical tree shaking apparatus constructed according to the invention as it appears in operative position on a tree with the shaker being mounted on a tractor;

FIGURE 2, an enlarged plan view of the tree shaking apparatus shown in FIGURE 1, certain of the supporting structure being removed;

FIGURE 3, an elevational view of the tree shaking apparatus shown in FIGURE 2 taken substantially in the plane of line 3—3 thereof with certain parts being broken away to better illustrate internal structure; and FIGURE 4, a diagrammatic view illustrating a typical hydraulic power supply system that is used in a preferred form of the invention.

While only the preferred form of the invention is shown, it should be understood that various changes or modifications may be made within the scope of the claims attached hereto without departing from the spirit of the invention.

Referring to the drawing in greater detail, there is shown a tree shaking apparatus 11 adapted to be held by a tree 12 to be shaken comprising a vibrating unit 13 containing a pair of eccentrically weighted rotors 14 and 16 together with means for imparting rotary motion to each of the rotors and clamping means 17 to hold the vibrating unit 13 in place on the tree 12.

During shaking, the vibrating unit 13 is freely mounted on the tree 12, that is it should not be impeded in its vibratory motion unduly by any external structure. However, it is desirable to provide means for transporting the vibrating unit 13 easily from one place to another so as to conduct efficient shaking operations on a large number of trees. For this reason, the vibrating unit 13 contains a frame 18 which is held in swinging fashion by a support 19. As best seen in FIGURES 1 and 2, the support 19 is fork shaped and has a pair of parallel members 21 and 22 adapted to fit horizontally on each side of the tree to be shaken. The frame 18 is held in swinging fashion from these members by means of four connecting rods 23 held in shock absorbers 24 as best seen in FIGURES 2 and 3.

The support 19 may be attached to any suitable vehicle, and a preferred attachment is that shown in FIGURE 1. As there shown, the support is attached to a tractor 24 through suitable linkages 26 which are adapted to provide elevation to support 19 and yet retain it in the substantially horizontal position. These linkages are constructed to be raised and lowered by standard lifts utilized for handling other tools which are constructed for use with a tractor.

Thus it is seen that the frame 18 holding the vibrating unit 13 is free to swing horizontally in all directions with the four connecting rods 23 serving as pendulum rods. This allows the vibrating unit and tree to move in any horizontal position desired without undue restraint from the support. In addition, the entire unit may be wheeled into position by the tractor and used without any need for disconnection.

The vibrating unit 13 is preferably composed of two similar vibrating elements 27 which are slidably mounted on rods 28 and 29 through two pairs of sleeves 30 and 31. Each pair of sleeves 30 and 31 are held as a single unit by cross bars 32 and 33 and the vibrating elements are urged relatively toward one another by forces applied to these cross bars. These forces are obtained by operation of a hydraulic cylinder 34 and its associated connecting rods 35 which carries a piston 36 at one end as shown in FIGURE 4. In other words, the cylinder 34 is attached to cross bar 33 at 37 and the connecting rod 35 is attached to cross bar 32 at 38 so that on movement of hydraulic fluid into the cylinder 34 through lines 39 or 41, the cross bars 32 and 33 are urged relatively toward one another or away from one another to the full extent possible depending which line is pressurized.

In this way, the hydraulic cylinder and associated equipment serves as the mobile part of the clamping means 17, while the clamping jaws are preferably flexible pads 42 and 43 positioned in face to face relationship on each of the vibrating elements 27. Preferably, these flexible pads are composed of a rubber-like substance and contoured to spread their forces more evenly over the irregular shape of a trunk of a tree. In addition, these pads are pivotally mounted through the sets of U-shaped links 44 so as to be able to swivel in all directions.

Preferably, there are two sets of U-shaped links 44 per pad so that the pad is free to pivot vertically in any position adjusted by the inclination of the tree trunk being gripped. The two side pivots are adjusted so that as the pads are urged toward each other, they tend to wrap themselves part way around the tree trunk. A certain amount of stretch or elasticity is also desirable in this connection as it assists in the wrap around effect. Accordingly, rubber pads are preferred. With this construction, a very large contact area is effected between the vibrating element and the tree so that large forces may be transferred without injury to the tree.

As indicated above, the vibrating forces which shake the tree are actually obtained from the vibrating elements 27 of the vibrating unit 13 by virtue of rotation of the eccentrically weighted rotors 14 and 16. As here shown, these rotors each comprise a vertical shaft 46 having a horizontal shaft 47 extending perpendicularly therefrom so as to rotate the horizontal plane. Each of these shafts 47 are threaded to carry a weight 48 between a pair of nuts 49 and 51 (see FIGURE 2). In this way, the radial arm of the weight may be adjusted so as to change the eccentric action of the rotor. In addition, the weight 48 may be changed completely for a larger or smaller weight where large changes are to be effected.

As here shown, the rotors 14 and 16 are carried within a housing on each of the vibrating elements for the sake of safety and to prevent dirt and debris from interfering with the operation thereof. Thus, each housing has an access door 52 or removable panel so that the weight 48 may be adjusted or changed as desired.

As best seen in FIGURE 3, the rotors are preferably powered by a pair of hydraulic motors 53 and 54, and these motors operate independently of one another so that the weighted eccentrics may change their relative positions as a result of different speeds of rotation. This change of relative position of the weights is an important feature of the present invention and provides shaking in number of directions. In other words, the shaking forces may be obtained in the form of a rotating vector rotating about the tree from a starting position to a final position that will vary from time to time. In order to shake the tree, the vibrating units are clamped in place, and the hydraulic motors 53 and 54 are turned on so as to cause the rotors 14 and 16 to rotate. In general, the weights will be out of phase so that the rotors will work in different directions and produce a resultant force depending on the relative position of the weights.

However, it has been found in practice that these weights tend to seek a common position so that one rotor moves faster than the other until the weighted eccentrics are in phase and their weights become additive. When this occurs, the desired irregular shaking is reduced to a minmum so the motors are preferably turned off. With the power off, the weights generally come to rest at opposed positions. Therefore, when the power is again applied, the weights are out of phase again and produce the desired irregular shaking obtained by the pair of eccentrically weighted rotors. This stopping and starting procedure is continued until the shaking of the tree is completed.

Although hydraulic motors are the most practical for the purpose, it should be appreciated that other power means or other motors could be substituted if desired. However, it is found that hydraulic motors are quite suitable because a suitable hydraulic system may be mounted on a tractor and powered thereby so that the power of the tractor is utilized and the advantages of hydraulic control are obtained.

Accordingly, FIGURE 4 shows a typical hydraulic system including a pump 56 which takes hydraulic fluid from a reservoir 57 and supplies it under pressure in line 58. The pump is attached to the power take-off of the tractor and thereby converts tractor engine power to hydraulic power for use in the tree shaking apparatus. Line 58 is divided into supply line 59 leading to the cylinder 34 and supply line 61 which operates the motors 53 and 54. Thus fluid from the supply line 59 goes through valve 62 to the appropriate side of cylinder 34 through either line 63 or 64 depending upon the valve position and returns through the other line to exhaust line 66. Hydraulic fluid in line 61 similarly goes through valve 67 and through supply lines 68 to both the motors 53 and 54 and back through return line 69 to the reservoir 57.

In order to operate the hydraulic valves 62 and 67, levers 71 and 72 are provided in a convenient position so that the operator may perform the desired shaking from the seat on the tractor.

In operation, the tractor 24 is driven into a position such that the vibrating unit 13 is centrally placed with its vibrating elements 27 on each side of a tree 12 to be shaken. Then the lever 71 is operated to move the hydraulic control valve 62 to the position shown in FIGURE 4. In this way cylinder 34 is operated to move the piston and shorten the distance between the cross bars 32 and 33. This in turn brings the vibrating elements 27 relatively toward one another and effects clamping of the flexible pads 42 and 43 against the tree. The special swivel mounting of these pads serves to spread the forces evenly as indicated above. With the vibrating unit in place, lever 72 is operated to turn on the hydraulic motors. The motors are then turned on and off until shaking is completed as described above.

After the tree is shaken, lever 71 is again operated to move slide valve 62 so that supply line 59 communicates with line 63 and line 64 is connected to exhaust line 66. This causes the piston in cylinder 34 to move and spread the vibrating units apart. The tractor is then driven to the next tree to repeat the process.

From the foregoing description, it is seen that I have provided an improved tree shaker capable of providing a shaking action which varies its direction so as to achieve optimum shaking of the tree for all of the parts of the tree to be shaken. It is also seen that I have provided an improved means for mounting the shaker on the tree and for providing efficient operation of the device.

I claim:
1. A tree shaker apparatus adapted to be held by a tree to be shaken comprising a frame member having a longitudinal axis, a pair of vibrating elements each slidably mounted on the end of said frame member on opposite sides of said axis for transverse movement relatively toward one another whereby the elements may be axially applied to grip a tree in clamping engagement, means for urging said vibrating elements relatively toward one another, an eccentrically weighted rotor on each vibrating element, motive means associated with each rotor, and a flexible pad mounted on each vibrating element in position between the vibrating elements to provide a cushioned grip on the tree to be shaken.

2. A tree shaker apparatus adapted to be held by a tree to be shaken comprising a frame member having a longitudinal axis, a pair of vibrating elements each slidably mounted on the end of said frame member on opposite sides of said axis for transverse movement relatively toward one another whereby the elements may be axially applied to grip a tree in clamping engagement, a hydraulic cylinder operatively connected between the vibrating elements to urge the elements relatively toward one another, an eccentrically weighted rotor on each vibrating element, a hydraulic motor on each rotor to provide mutually independent power means to each rotor, controlled means for supplying hydraulic fluid to the cylinder and to the motors, and a flexible pad mounted on each vibrating element in position between the vibrating elements to provide a cushioned grip on the tree to be shaken, each of said flexible pads being mounted through a pair of swivelable mountings located to urge the pad at each side of the tree and partially wrap the pad around the tree to effect a firm grip over a large area and minimize damage to the tree.

3. A tree shaker apparatus adapted to be held by a tree to be shaken comprising a support member having a longitudinal axis, means for mounting said support member on a wheeled vehicle, a frame member carried on the end of the support member and in swinging fashion with respect to the support member, a pair of vibrating elements each slidably mounted on said frame member on opposite sides of said axis for movement relatively toward one another whereby the elements may be axially applied to grip a tree in clamping engagement, means for urging said vibrating elements relatively toward one another, an eccentrically weighted rotor on each vibrating element, motive means associated with each rotor, and a flexible pad mounted on each vibrating element in position between the vibrating elements to provide a cushioned grip on the tree to be shaken.

4. A tree shaker apparatus adapted to be held by a tree to be shaken comprising a support member having a longitudinal axis, means for mounting said support member on a wheeled vehicle, a frame member carried on the end of the support member and in swinging fashion with respect to the support member, a pair of vibrating elements each slidably mounted on said frame member on opposite sides of said axis for transverse movement relatively toward one another whereby the elements may be axially applied to grip a tree in clamping engagement, a hydraulic cylinder operatively connected between the vibrating elements to urge the elements relatively toward one another, an eccentrically weighted rotor on each vibrating element, a hydraulic motor on each rotor to provide mutually independent power means to each rotor, controlled means for supplying hydraulic fluid to the cylinder and to the motors, and a flexible pad mounted on each vibrating element in position between the vibrating elements to provide a cushioned grip on the tree to be shaken, each of said flexible pads being mounted through a pair of swivelable mountings located to urge the pad at each side of the tree and partially wrap the pad around the tree to effect a firm grip over a large area and minimize damage to the tree.

5. The tree shaker apparatus defined in claim 4, in which the eccentrically weighted rotors are provided with adjustable weight elements.

6. The tree shaker defined in claim 4, in which the rotors are mounted to rotate in a substantially common horizontal plane when the unit is mounted on a substantially vertical tree trunk.

References Cited
UNITED STATES PATENTS

| | | | |
|---|---|---|---|
| 2,972,964 | 2/1961 | Allemann | 294—88 |
| 3,077,721 | 2/1963 | Balsbaugh | 56—328 |
| 3,163,458 | 12/1964 | Brandt | 56—328 |
| 3,220,268 | 11/1965 | Brandt | 74—87 |

ABRAHAM G. STONE, *Primary Examiner.*

ANTONIO F. GUIDA, *Examiner.*

P. A. RAZZANO, *Assistant Examiner.*